United States Patent
Okada et al.

(10) Patent No.: US 7,607,681 B2
(45) Date of Patent: Oct. 27, 2009

(54) AIRBAG COVER

(75) Inventors: Yasushi Okada, Aichi-ken (JP); Masako Asai, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 295 days.

(21) Appl. No.: 11/702,499

(22) Filed: Feb. 6, 2007

(65) Prior Publication Data
US 2007/0205585 A1      Sep. 6, 2007

(30) Foreign Application Priority Data
Mar. 3, 2006   (JP) .............................. 2006-057920

(51) Int. Cl.
*B60R 21/20* (2006.01)
(52) U.S. Cl. ............... 280/728.3; 280/731; 280/732
(58) Field of Classification Search ............. 280/728.3, 280/731, 732
See application file for complete search history.

(56) References Cited

U.S. PATENT DOCUMENTS

| | | | |
|---|---|---|---|
| 5,060,971 A | | 10/1991 | Nanbu et al. |
| 5,152,548 A | * | 10/1992 | Zushi ...................... 280/728.3 |
| 5,174,602 A | * | 12/1992 | Nakayama et al. ....... 280/728.3 |
| 5,431,434 A | * | 7/1995 | Yamakawa et al. ....... 280/728.3 |
| 5,582,424 A | * | 12/1996 | Okuyama et al. ........ 280/728.3 |
| 5,650,115 A | * | 7/1997 | Proos et al. ................ 264/400 |
| 5,803,489 A | * | 9/1998 | Nusshor ................... 280/728.3 |
| 6,402,189 B1 | * | 6/2002 | Gray et al. ................ 280/728.3 |
| 6,502,852 B2 | * | 1/2003 | Kassman et al. ......... 280/728.3 |
| 6,808,197 B2 | * | 10/2004 | Bauer et al. .............. 280/728.3 |
| 7,029,025 B2 | * | 4/2006 | Schwark et al. .......... 280/728.3 |
| 7,398,991 B2 | * | 7/2008 | Hayashi et al. .......... 280/728.3 |

FOREIGN PATENT DOCUMENTS

| | | |
|---|---|---|
| DE | 40 05 188 A1 | 8/1990 |
| DE | 100 55 546 | 9/2001 |

(Continued)

OTHER PUBLICATIONS

Office Action dated Nov. 19, 2007 in corresponding German Patent Application No. 10 2007 007 822.8 (and English translation).

*Primary Examiner*—Toan C To
(74) *Attorney, Agent, or Firm*—Posz Law Group, PLC

(57) ABSTRACT

An airbag cover has lid portions which are opened by a breakable portion being broken when the airbag cover is pushed by an airbag which is being inflated and is formed from a synthetic resin by molding into a single layered airbag cover. A breakable portion on a distal side of the lid portions is formed as a distal edge straight section through cutting operation which utilizes a cutting blade. The part is formed by providing a thick portion and a thin portion so that a maximum change rate which is a rate of difference between a maximum value and a minimum value based on the maximum value is made to be 15% or more without providing at both ends of a sectional area change curve marked by plotting along the part values of sectional areas of a segment of 50 mm along the part an area where the values of the sectional areas are reduced from a center towards both ends thereof as a range where the values of the sectional areas are larger than the minimum value.

6 Claims, 19 Drawing Sheets

FOREIGN PATENT DOCUMENTS

| | | |
|---|---|---|
| DE | 101 29 618 | 1/2003 |
| DE | 103 52 581 | 6/2005 |
| DE | 103 61 581 | 7/2005 |
| JP | A-5-105016 | 4/1993 |
| JP | A-2005-289254 | 10/2005 |

* cited by examiner

FIG. 7

| PATTERN NO. | THICKNESS OF THICK PORTION (mm) | LENGTH L2 (mm) | THICKNESS OF THIN PORTION (mm) | LENGTH L3 (mm) | NUMBER OF THIN PORTION | LENGTH L4 (mm) | SECTIONAL AREA (mm²) | SECTIONAL AREA CHANGE CURVE MAX | SECTIONAL AREA CHANGE CURVE MIN | MAXIMUM REDUCTION RATE | TEARING PATTERN | INTERNAL PRESSURE (kPa) (AT LOW TEMPERATURE) | BREAKAGE LOAD DETERMINATION |
|---|---|---|---|---|---|---|---|---|---|---|---|---|---|
| AC1 | (MOLDED TEAR) THICKNESS 0.8mm CONSTANT | | | | | | 152 | - | - | - | | 400-450kPa | × |
| AC2 | THICKNESS 0.8mm CONSTANT | | | | | | 152 | - | - | - | | 296 | ○ |
| AC3 | THICKNESS 1.0mm CONSTANT | | | | | | 190 | - | - | - | | 448 | × |
| AC4 | THICKNESS 1.2mm CONSTANT | | | | | | 228 | - | - | - | | 597 | × |
| 1 | 1.2 | 30 | 0.8 | 32 | 2 LOCATIONS | 8 | 197 | 56.16 | 45.24 | 19% | | 331 | ○ |
| 2 | 1.4 | 30 | 0.8 | 32 | 2 LOCATIONS | 8 | 219 | 63.96 | 47.58 | 26% | | 325 | ○ |

FIG. 8

| PATTERN NO. | THICKNESS OF THICK PORTION (mm) | LENGTH L2 (mm) | THICKNESS OF THIN PORTION (mm) | LENGTH L3 (mm) | NUMBER OF THIN PORTION | LENGTH L4 (mm) | SECTIONAL AREA (mm²) | SECTIONAL AREA CHANGE CURVE MAX | MIN | MAXIMUM REDUCTION RATE | TEARING PATTERN | INTERNAL PRESSURE (kPa) (AT LOW TEMPERATURE) | BREAKAGE LOAD DETERMINATION |
|---|---|---|---|---|---|---|---|---|---|---|---|---|---|
| 3 | 1.2 | - | 0.8 | 36 | 1 LOCATION | 8 | 211 | 60.84 | 44.07 | 27% | | 356 | ○ |
| 4 | 1.2 | 30 | 0.8 | 16 | 2 LOCATIONS | 8 | 209 | 60.45 | 51.48 | 14% | | 499 | × |
| 5 | 1.4 | 20 | 0.8 | 16 | 3 LOCATIONS | 8 | 226 | 61.62 | 54.60 | 11% | | 555 | × |
| 6 | 1.4 | 20 | 0.6 | 16 | 3 LOCATIONS | 8 | 213 | 56.16 | 49.14 | 13% | | 420 | × |
| 7 | 1.4 | - | 0.8 | 48 | 1 LOCATION | 8 | 236 | 70.98 | 41.73 | 41% | | 370 | ○ |
| 8 | 1.4 | - | 0.6 | 48 | 1 LOCATION | 8 | 225 | 70.98 | 31.98 | 54% | | 287 | ○ |

FIG. 9

| PATTERN NO. | THICKNESS OF THICK PORTION (mm) | LENGTH L2 (mm) | THICKNESS OF THIN PORTION (mm) | LENGTH L3 (mm) | NUMBER OF THIN PORTION | LENGTH L4 (mm) | SECTIONAL AREA (mm²) | SECTIONAL AREA CHANGE CURVE MAX | SECTIONAL AREA CHANGE CURVE MIN | MAXIMUM REDUCTION RATE | TEARING PATTERN | INTERNAL PRESSURE (kPa) (AT LOW TEMPERATURE) | BREAKAGE LOAD DETERMINATION |
|---|---|---|---|---|---|---|---|---|---|---|---|---|---|
| 9 | 1.4 | - | 0.8 | - | - | - | 211 | 56.36 | 55.19 | 2% | | 445 | × |
| 10 | 1.2 | 12 | 0.8 | 24 | 2 LOCATIONS | 8 | 203 | 60.84 | 48.36 | 21% | | 321 | ○ |
| 11 | 1.2 | 66 | 0.8 | 32 | 2 LOCATIONS | 8 | 197 | 60.84 | 45.24 | 26% | | 321 | ○ |
| 12 | 1.2 | 12 | 0.8 | 16 | 2 LOCATIONS | 8 | 209 | 60.84 | 48.36 | 21% | | 342 | ○ |
| 13 | 1.4 | 8 | 0.8 | 16 | 3 LOCATIONS | 8 | 226 | 68.64 | 49.92 | 27% | | 366 | ○ |
| 14 | 1.2 | 30 | 1.0 | 32 | 2 LOCATIONS | 4 | 212 | 58.50 | 53.04 | 9% | | 422 | × |

FIG. 10

| PATTERN NO. | THICKNESS OF THICK PORTION (mm) | LENGTH L2 (mm) | THICKNESS OF THIN PORTION (mm) | LENGTH L3 (mm) | NUMBER OF THIN PORTION | LENGTH L4 (mm) | SECTIONAL AREA (mm²) | SECTIONAL AREA CHANGE CURVE | | | TEARING PATTERN | INTERNAL PRESSURE (kPa) (AT LOW TEMPERATURE) | BREAKAGE LOAD DETERMINATION |
|---|---|---|---|---|---|---|---|---|---|---|---|---|---|
| | | | | | | | | MAX | MIN | MAXIMUM REDUCTION RATE | | | |
| 15 | 1.4 | 30 | 1.0 | 32 | 2 LOCATIONS | 8 | 235 | 66.30 | 55.38 | 16% | | 331 | ○ |
| 16 | 1.2 | – | 1.0 | 36 | 1 LOCATION | 4 | 219 | 60.84 | 52.26 | 14% | | 437 | × |
| 17 | 1.2 | 12 | 1.0 | 24 | 2 LOCATIONS | 8 | 216 | 60.84 | 54.60 | 10% | | NO PROPER DEPLOYMENT | × |
| 18 | 1.4 | 40 | 0.8 | 16 | 3 LOCATIONS | 8 | 226 | 68.06 | 54.60 | 20% | | 549 | × |
| 19 | 1.2 | 100 | 0.8 | 32 | 2 LOCATIONS | 8 | 197 | 60.84 | 45.24 | 26% | | 329 | ○ |

AIRBAG COVER

BACKGROUND OF THE INVENTION

1. Field of the Invention

The present invention relates to an airbag cover adapted to cover a folded airbag, having a lid portion which is opened to form a projection opening through which the airbag projects when a thin breakable portion which is provided to surround the lid portion is broken by a pressure of the inflating airbag, and formed from a synthetic resin material by molding.

2. Related Art

In a conventional airbag cover which is made from a synthetic resin, a thin breakable portion was formed around a lid portion so that the lid portion could be opened to form a projection opening when the cover was pushed by an airbag (refer to, for example, JP-A-2005-289254). This breakable portion was made by providing a recessed groove on a rear surface side of the airbag cover which was injection molded, and furthermore, in order to enable the operation of forming the breakable portion with enhanced dimension accuracy as to the depth of the recessed groove so provided, the breakable portion was formed through cutting operation in which a notch was made by making use of a cutting blade of a working tool such as an ultrasonic cutter. Furthermore, in a part of the breakable portion which lay on a distal edge of the lid portion which lay away from a hinge portion of the lid portion which functioned as a hinge when the lid portion was opened and which was provided in the shape of a straight line (a distal edge straight section), a deformation preventive thick part was provided to reduce the deformation of the airbag cover in the vicinity of the distal edge straight section when the airbag is normally pressed (to prevent the occurrence of easy deformation in the airbag cover in the relevant portion thereof at the time of contact), and in order to make this happen, the airbag cover was worked to have a zigzag cross section along the distal edge straight section so that thick portions were provided discontinuously while providing thin portions.

Of course, as airbag covers in which thick portions and thin portions were provided in a distal edge straight section of a breakable portion, there were airbag covers in which thick portions and thin portions were provided discontinuously and integrally with the airbag cover at the time of injection molding without adopting the cutting operation. (refer to, for example, JP-A-5-105016)

With the shape of cross section, however, which can prevent the unnecessary deformation of the airbag cover when it is pressed during the normal use even though the airbag cover is molded by molding such as injection molding and thereafter, the distal edge straight section having the zigzag cross section is formed in the breakable portion by the cutting operation, it is difficult to reduce the breakage load at the distal edge straight section in the breakable portion, and in particular, with a single-layered airbag cover which was formed from a kind of, for example, polyolefin-based synthetic resin material, it was difficult to suppress the breakage load to a low level at the time of low temperatures.

Similarly, with a single layered airbag cover which was produced through only molding such as injection molding, when providing thick portions and thin portions at the distal edge straight section of the breakable portion, even though the thicknesses of the thick portions and the thin portions were made to be substantially the same as those provided by the cutting operation, the breakage load was easy to be increased due to a problem related to the injection molding that the density of the material was increased by the injection pressure.

SUMMARY OF THE INVENTION

The invention was made with a view to solving the problems, and an object thereof is to provide a single layered airbag cover which can avoid the state where the airbag cover is depressed unnecessarily when it is pressed even though the distal edge straight section of the breakable portion is formed by the cutting operation and can reduce the breakage load at low temperatures.

According to one aspect of the invention, there is provided an airbag cover adapted to cover a folded airbag, having a lid portion which is opened to form a projection opening through which the airbag projects when a thin breakable portion which is provided to surround the lid portion is broken by a pressure of the inflating airbag, and formed by use of a kind of synthetic resin material by molding as a single-layered airbag cover, a part of the breakable portion which lies on a distal edge of the lid portion which lies away from a hinge portion of the lid portion which functions as a hinge when the lid portion is opened and where the breakable portion is provided being formed into a distal edge straight section which is provided in the shape of a straight line, the distal edge straight section being formed through cutting operation in which a working tool is moved over a rear surface side of the airbag cover after the airbag cover has been molded so as to form a notch therein by a cutting blade of the working tool, wherein the distal edge straight section is formed by providing discontinuously a thick portion whose thickness is made to fall in the range of 1.0 to 1.6 mm and a thin portion whose thickness is made to fall in the range of 0.6 to 1.0 mm so as to be thinner than the thick portion within a working area whose thickness is set to range from 2.0 to 3.0 mm, and wherein in a sectional area change curve marked by plotting along the distal edge straight section values of sectional areas of a segment of 50 mm along the distal edge straight section, the thick portion and the thin portion are formed so that a maximum change rate which is a rate of difference between a maximum value and a minimum value based on the maximum value is made to be 15% or more without providing an area where the values of the sectional areas are reduced from a center towards both ends thereof at both ends of the sectional area change curve as a range where the values of the sectional areas are larger than the minimum value.

With the airbag cover according to the invention, when the lid portion is opened by being pushed by the airbag, the distal edge straight section receives a tensile force in a direction which intersects a direction in which the distal edge straight section is provided at right angles, and a concentration of stress is easy to be produced in the vicinity of an end portion of the thick portion which lies to face the thick portion and where there occurs a change in thickness, and a breakage is initiated from the relevant part.

As this occurs, with the airbag cover according to the invention, in the sectional area change curve marked by plotting along the distal edge straight section the values of the sectional areas of the segment of 50 mm along the distal edge straight section, the thick portion and the thin portion are formed so that the maximum change rate which is the rate of difference between the maximum value and the minimum value based on the maximum value is made to be 15% or more. Namely, in the event that the maximum reduction rate (the rate of difference between the maximum value and the minimum value) is 15% or more, stress is easy to be concentrated on the thick portion side end portion of the thin portion where there exists a change in thickness, and elongation is suppressed at the thick portion side end portion of the thin portion, whereby the relevant end portion of the thin portion becomes easy to be broken or ruptured, so as to reduce the breakage load even at low temperatures, thereby making it possible to allow the distal edge straight section to be broken.

On the other hand, in the event that the maximum reduction rate in the sectional area change curve is less than 15%, the difference in thickness between the thick portion and the thin portion throughout the segment of 50 mm is small. Namely, even though the difference in thickness between the thick portion and the thin portion is large locally (for example, a case where the thickness of the thick portion is set to 1.4 mm and the thickness of the thin portion to 0.6 mm), the difference in thickness between the thick portion and the thin portion throughout the segment of 50 mm is small, in which case, when the thin portion is about to be broken by exertion of a tensile force on the distal edge straight section due to the airbag cover being pushed by the airbag which is being inflated, the thick portions which surround the thin portion can resist the tensile force so exerted so as to prevent the breakage of the thin portion. Because of this, with the maximum reduction rate of the sectional area change curve being less than 15%, the difference in thickness between the thick portion and the thin portion throughout the segment of 50 mm becomes small, and the elongation of the thick portion side end portion of the thin portion is easy to be restricted by the thick portions which surround the relevant thin portion, whereby it becomes difficult to reduce the breakage load at low temperatures.

Furthermore, with the airbag cover according to the invention, in the sectional area change curve marked by plotting along the distal edge straight section the values of the sectional areas of the segment of 50 mm along the distal edge straight section, the thick portion and the thin portion are formed without providing the area where the values of the sectional areas are reduced from the center towards both the ends thereof as the range where the values of the sectional areas are larger than the minimum value at both the ends of the sectional area change curve. Namely, at the distal edge straight section where the area where the values of the sectional areas are reduced from the center although not to the minimum value is provided at both the ends of the sectional area change curve, on the contrary, an area where the value of the sectional area becomes minimum is disposed in the vicinity of the center which lies away from both the ends, and parts where the value of the sectional area is increased are disposed on both sides of the area of the minimum sectional area value. In other words, this construction results in a construction where the thin portion is situated at the center of the distal edge straight section, the thick portions are situated on both sides of the thin portion, and the thin portions are situated outwards of the thick portions, respectively. In this construction, even though the difference between the maximum value and the minimum value of the sectional area change curve becomes 15% or more due to the difference in thickness between the thin portion lying at the center of the distal edge straight section and the thick portions lying on both the sides of the relevant thin portion, when the airbag cover is pushed by the airbag which is being inflated, a case may be called for where a certain degree of elongation occurs in all the thin portions along the distal edge straight section including the thin portion at the center thereof. As such a case occurs, the breakage load of the whole of the distal edge straight section is increased, so as to disrupt the effect to reduce the breakage load. Therefore, to deal with this, the thick portion and the thin portion need to be provided without providing the area where the values of the sectional areas are reduced from the center towards both the ends thereof as the range where the values of the sectional areas are larger than the minimum value at both the ends of the sectional area change curve.

In addition, at the distal edge straight section, not only the thin portion whose thickness falls in the range of 0.6 to 1.0 mm but also the thick portion whose thickness falls in the range of 1.0 to 1.6 mm are formed, whereby the occurrence of easy deformation in the airbag cover can be suppressed even when the airbag cover is pressed unnecessarily. Incidentally, the value of 0.6 mm which constitutes a lower limit of the thickness of the thin portion is a limit value which enables cutting operation with a stable working accuracy, and the value of 1.0 mm which constitutes a lower limit of the thickness of the thick portion is a limit value which prevents the user from feeling that the airbag cover is depressed too easily when he or she presses the cover. In addition, the value of 1.0 mm which constitutes an upper limit of the thickness of the thin portion is a limit value which produces a difference in thickness between the thick portion and the thin portion, and the value of 1.6 mm which constitutes an upper limit of the thickness of the thick portion is a limit value which produces the required effect, with a value larger than that value, a waste of material results.

As a molding material for a single layered airbag cover like this, for example, a polyolefin-based thermoplastic elastomer and a polyethylene-based thermoplastic elastomer can be raised, and as physical properties thereof, the elongation under JIS-K6251 is preferably set to range from 550 to 750%, the impact strength at −40° C. under D256 of the ASTM testing method is preferably set to range from 80 to 120 J/m, and the bending elastic modulus of JIS-K7203 is preferably set to range 250 to 550 Mpa.

Consequently, with the airbag cover according to the invention, even though it is formed into the single layered airbag cover and the distal edge straight section is formed through the cutting operation, the problem of the occurrence of unnecessary deformation when the airbag cover is pressed can be avoided, and the breakage load at low temperatures can be reduced.

BRIEF DESCRIPTION OF THE DRAWINGS

FIG. 7 is a diagram which shows tearing patterns of distal edge straight sections of comparison examples, the embodiment and a modified example of the embodiment.

FIG. 8 is a diagram which shows tearing patterns of distal edge straight sections of comparison examples and modified examples of the embodiment.

FIG. 9 is a diagram which shows tearing patterns of distal edge straight sections of comparison examples and other modified examples of the embodiment.

FIG. 10 is a diagram which shows tearing patterns of distal edge straight sections of comparison examples and other modified examples of the embodiment.

DETAILED DESCRIPTION OF THE PREFERRED EMBODIMENTS

Figure 1:
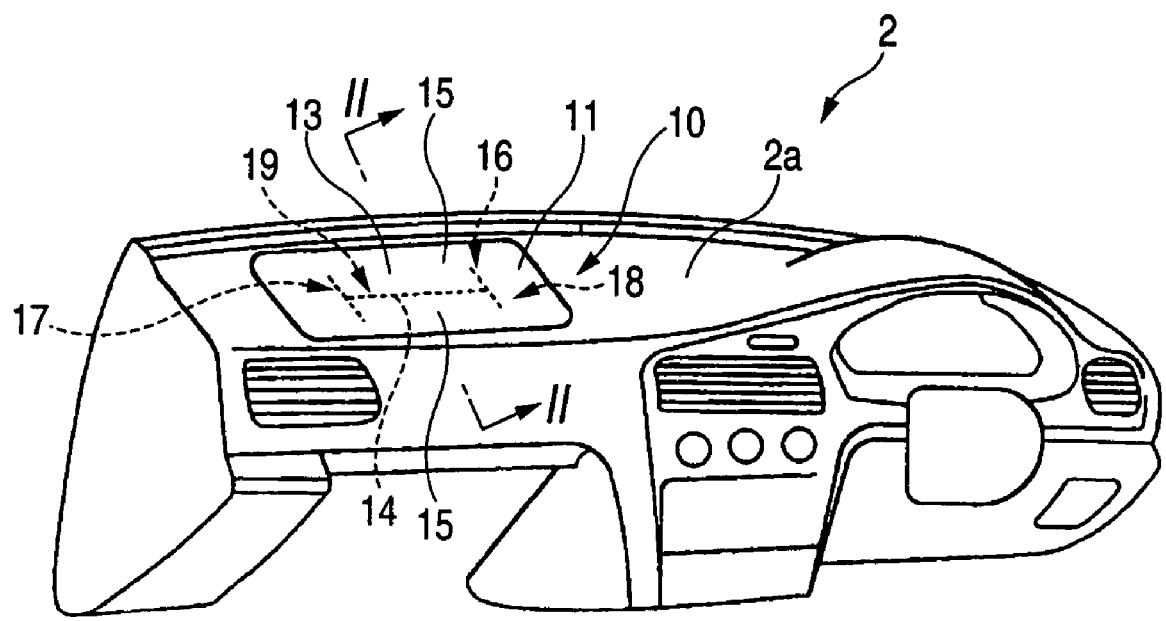
FIG. 1 is a perspective view showing an in-use state of an airbag cover of an embodiment of the invention.
Figure 2:
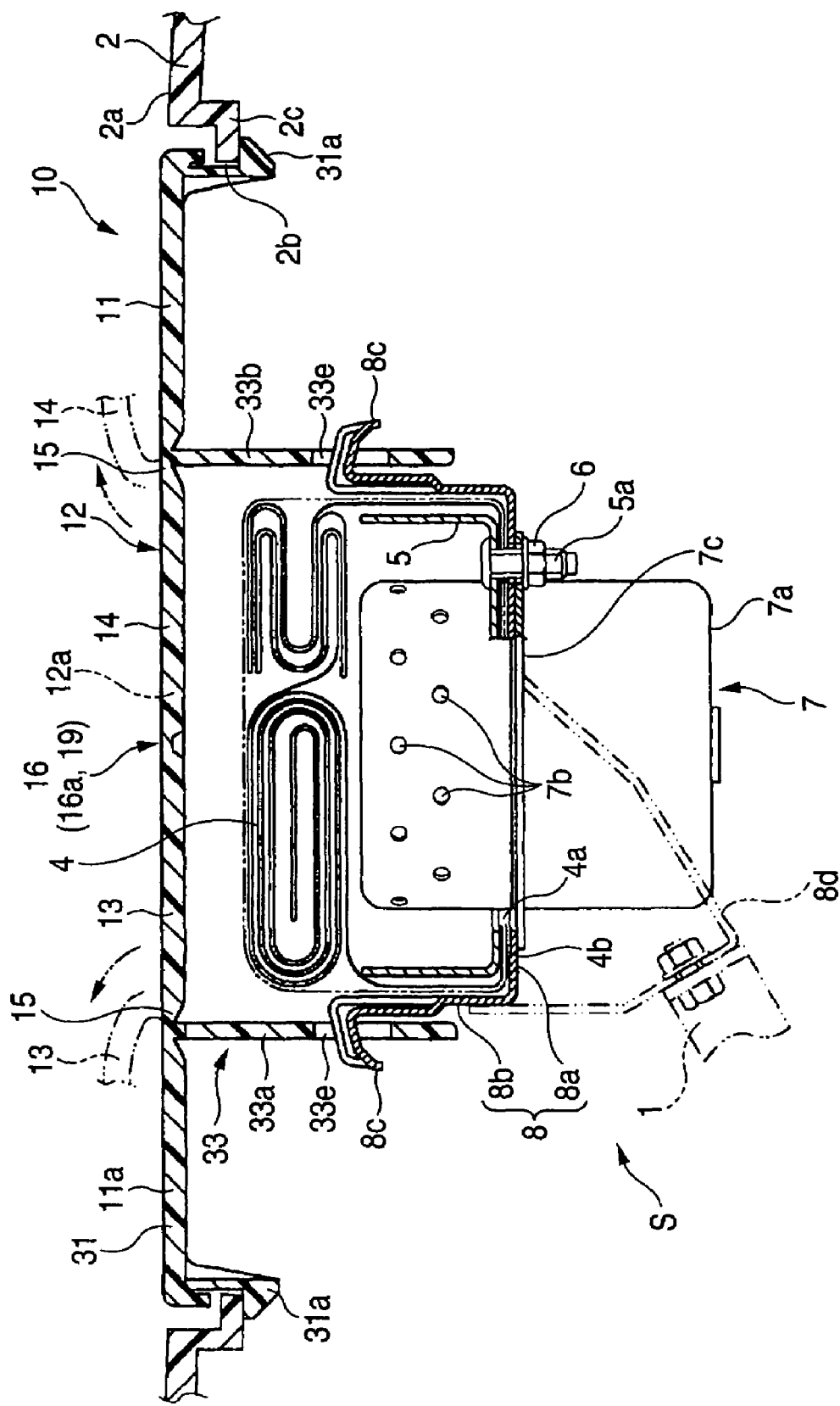
FIG. 2 is a sectional view of an airbag system in which the airbag cover of the embodiment is used, which corresponds to a location taken along the line II-II in FIG. 1.
Figure 3:
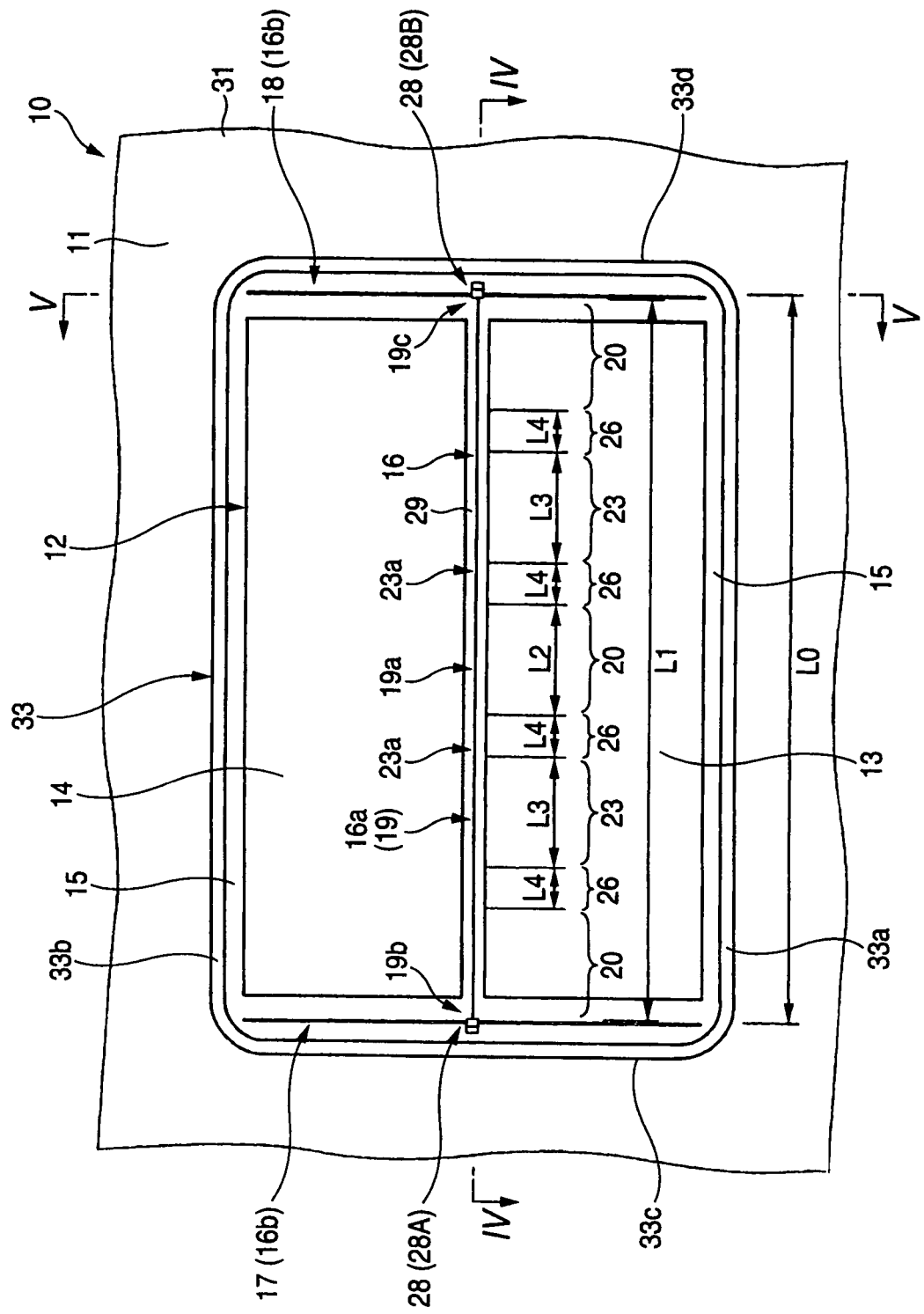
FIG. 3 is a partial bottom view of the airbag cover of the embodiment, which shows the vicinity of a breakable portion.

Hereinafter, an embodiment of the invention will be described based on the accompanying drawings. As is shown in FIGS. 1 to 3, an airbag cover 10 according to the embodiment is such as to be used in an airbag system S for a passenger or occupant seated in a front passenger's seat, is made through injection molding from a synthetic resin such as an olefin-based thermoplastic elastomer, and is provided in an opening 2b on an upper surface 2a side of an instrument panel 2 lying in front of the front passenger's seat.

Note that used in this specification, vertical, longitudinal and transverse directions are understood to coincide with vertical, longitudinal and transverse directions of a vehicle in such a state that the vehicle travels straight ahead based on a state in which the airbag cover 10 is installed on the vehicle in such a way as designed.

In addition, the airbag system S for the front seat passenger is made up of a folded airbag 4, an inflator 7 for supplying the airbag 4 with inflation gas, a case 8 which accommodates and holds the airbag 4 and the inflator 7, a retainer 5 for mounting the airbag 4 in place in the case 8, and the airbag cover 10 which covers the folded airbag 4.

The airbag 4 is made, when completely inflated, to take a substantially quadrangular pyramidal shape in which a front end side of the airbag constitutes an apex portion of the pyramid and a rear surface side of a bottom of the airbag, which constitutes a base of the pyramid, constitutes an occupant restraint portion. When installed on a vehicle, this airbag 4 is folded towards the upper surface 2a side of the instrument panel 2 lying in front of the front passenger's seat for storage, and when an inflation gas flows thereinto, the airbag 4 projects upwards so as to cover a space defined between the upper surface 2a of the instrument panel 2 and a windshield provided above the instrument panel 2, while projecting rearwards to protect the front seat passenger by means of the occupant restraint portion on the rear surface side thereof.

In addition, the inflator 7 is made up of a substantially cylindrical main body portion 7a having a plurality of gas outlets 7b and a flange portion 7c via which the inflator 7 is attached to the case 8.

Furthermore, the case 8 is formed into a substantially rectangular parallelepiped shape made of sheet metal and having a rectangular opening on an upper end side thereof and is made up of a substantially rectangular plate-shaped bottom wall portion 8a through which the inflator 7 is passed from therebelow for attachment thereto and a circumferential wall portion 8b which extends upwards from an outer circumferential edge of the bottom wall portion 8a. A plurality of locking claws 8c are formed at an upper end of the circumferential wall portion 8b for locking a side wall portion 33 of the airbag cover 10. A bracket 8d is provided on the case 8 at a location where the bottom wall portion 8a lies in such a manner as to be connected to a body 1 of the vehicle.

In addition, the airbag 4 and the inflator 7 are attached to the case 8 because of a plurality of bolts 5a of the annular retainer 5 which is provided within the airbag 4 being passed through a circumferential edge 4b of an opening 4a in the airbag 4, the flange portion 7c of the inflator 7 and the case bottom wall portion 8a so as to be fastened by corresponding nuts 6.

The airbag cover 10 is, as is shown in FIGS. 1 to 5, made up of a ceiling wall portion 11 which is formed into a rectangular plate shape which can cover the opening 2b in the instrument panel 2 and a side wall portion 33 which is formed into a substantially quadrangular tubular shape and which extends downwards from a lower surface (a rear surface) side of the ceiling wall portion 11. A plurality of locking holes 33e are formed in a front wall portion 33a and a rear wall portion 33b which constitutes front and rear wall portions of the side wall portion 33 so that the locking claws 8c of the circumferential wall portion 8b of the case 8 pass therethrough to be locked to circumferential edges of the locking holes 33e so formed. The side wall portion 33 makes up a part which covers the periphery of the folded airbag 4 together with the circumferential wall portion 8b of the case 8.

In addition, the airbag cover 10 of the embodiment is formed into a single layered airbag cover from a polyolefin-based thermoplastic elastomer, and in the molding material according to the embodiment, the elongation under JIS-K6251 is set to on the order of 700% so as to fall in the range of 550 to 750%, the impact strength at −40° C. under D256 of the ASTM testing method is set to on the order of 90 J/m so as to fall in the range of 80 to 120 J/m, and the bending elastic modulus of JIS-K7203 is set to 400 MPa so as to fall in the range of 250 to 550 MPa.

The ceiling wall portion 11 is made to include a projection opening portion 12 which is disposed in a location surrounded by the side wall portion 33 and a circumferential edge portion 31 which lies around the projection opening portion 12. A plurality of locking legs 31a are provided on the circumferential edge portion 33 in such a manner as to protrude downwards therefrom so as to be locked to an opening circumferential edge 2c of the opening 2b in the instrument panel 2 to thereby eliminate the looseness of the airbag cover 10 when the airbag cover 10 is placed to cover the opening 2b.

The projection opening portion 12 is formed into a rectangular plate shape and has provided thereon a thin breakable portion 16 which extends into a straight-line shape. This breakable portion 16 is formed by providing a recessed groove 16a and a recessed groove 16b which are recessed from a rear surface side towards a front surface side of the airbag cover 10, and in the case of this embodiment, the breakable portion 16 is formed into an H-shape as viewed from the top. Namely, the breakable portion 16 is made up of edge-side straight line-shaped parts 17, 18 which constitute longitudinal rod-like parts lying on both sides of the H-shape and a distal edge straight section 19 which constitutes a lateral rod-like part of the H-shape. Because of this, when the breakable portion 16 is broken, two front and rear lid portions 13, 14 between which the distal edge straight section 19 is situated open forwards and rearwards, respectively, so as to form a rectangular projection opening 12a through which the airbag 4 is allowed to project. When opening, the lid portion 13 rotates upwards about a hinge portion 15 disposed on a front edge side thereof as a rotational center and then opens forwards, while when opening, the lid portion 14 rotates upwards about a hinge portion 15 disposed on a rear edge side thereof as a rotational center and then opens rearwards. The hinge portions 15 are disposed in the positions of internal surfaces of the front wall portion 33a and rear wall portion 33b of the side wall portion 33, respectively, as parts which connect together both ends of the longitudinal rod-like portions (the edge-side straight line-shaped parts 17, 18) lying on both sides of the H-shape which face each other in a transverse direction. Namely, in the case of this embodiment, the distal edge straight section 19 is disposed in a straight line on a distal side of the two lid portions 13, 14 which lies away from the hinge portions 15 thereof and constitutes a common part for the two lid portions 13, 14.

In addition, in the event of this embodiment, the breakable portion 16 is made up of the two types of recessed grooves 16a, 16b, the two edge-side straight line-shaped parts 17, 18 are made up by providing the recessed grooves 16b which are formed by molding when the airbag cover 10 is injection molded, and the distal edge straight section 19 is made up by providing the recessed groove 16a which is formed by use of a cutter 35 after the airbag cover 10 has been molded in such a manner as to make a notch without producing swarf or cuttings.

In the case of this embodiment, as is shown in FIG. 6, the cutter 35 is an ultrasonic cutter whose main body portion 36 has a thickness ranging from 0.5 to 1.0 mm and which includes a single-edged cutting blade 37. The cutting blade 37 is formed inclined in such a manner as to extend from a tip or distal end 37a to a heel or proximal portion 37b side thereof in a direction in which the cutter is moved when operation of making a notch is performed. In addition, in the case of this embodiment, the cutter 35 is moved in its moving direction with the cutting blade 37 disposed on a front side of the moving direction, so as to form a notch which makes up the recessed groove 16a.

In addition, in the breakable portion 16 of the airbag cover 10, a cutting blade accommodating portion 28 which is recessed towards the front surface side of the cover 10 is formed at each of both end portions of the distal edge straight section 19 which intersect the edge-side straight line-shaped parts 17, 18. The cutting blade accommodating portions 28 are such as to be formed in advance at the time of molding and are provided to prevent the cutting blade 37 of the cutter 35 from making a notch in other locations than the recessed groove 16a which really need such a notch when forming the distal edge straight section 19 through the cutting operation.

Figure 4:
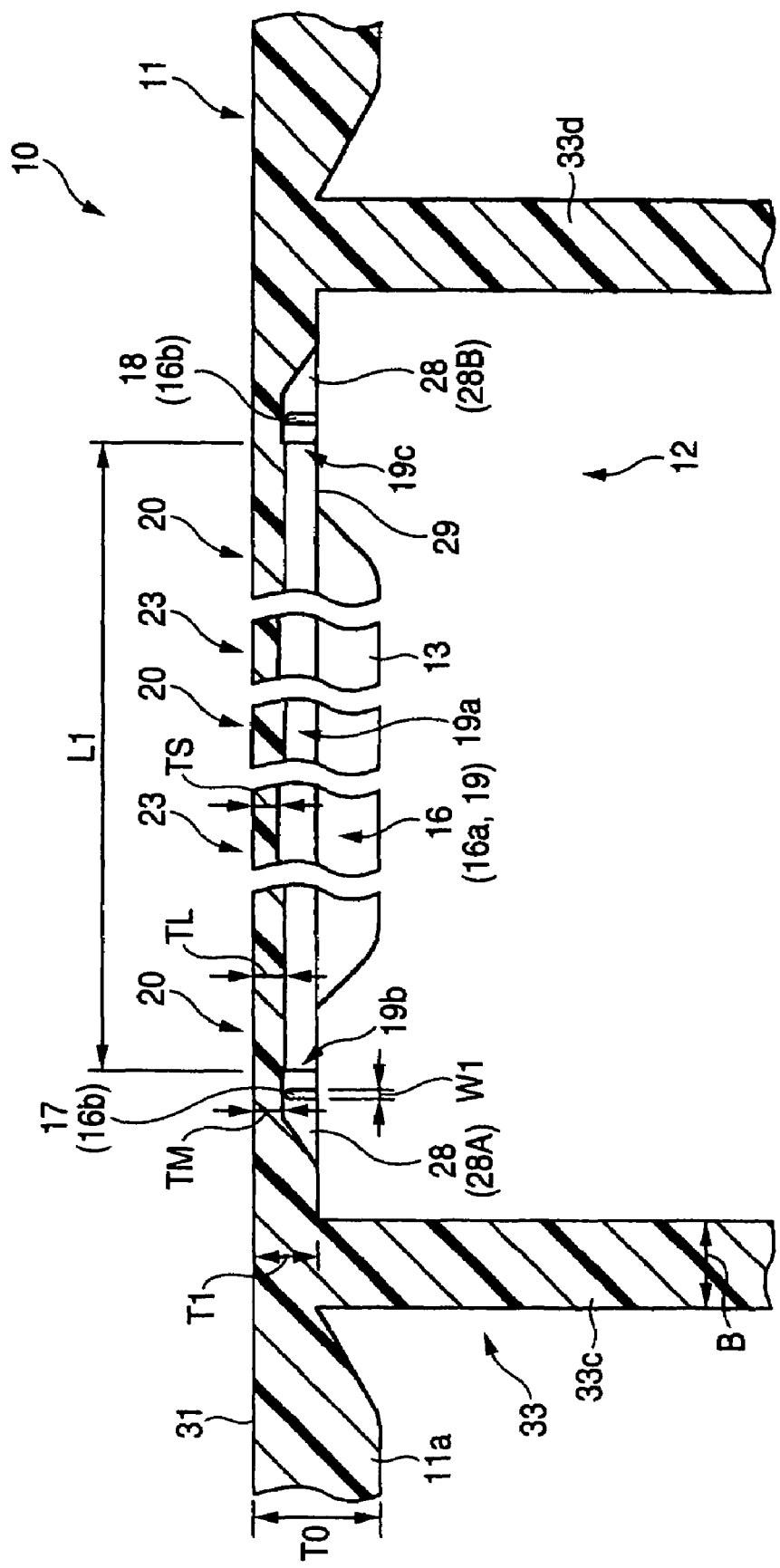
FIG. 4 is a partially omitted vertical sectional view of the airbag cover of the embodiment, which corresponds to a location taken along the line IV-IV in FIG. 3.
Figure 5:
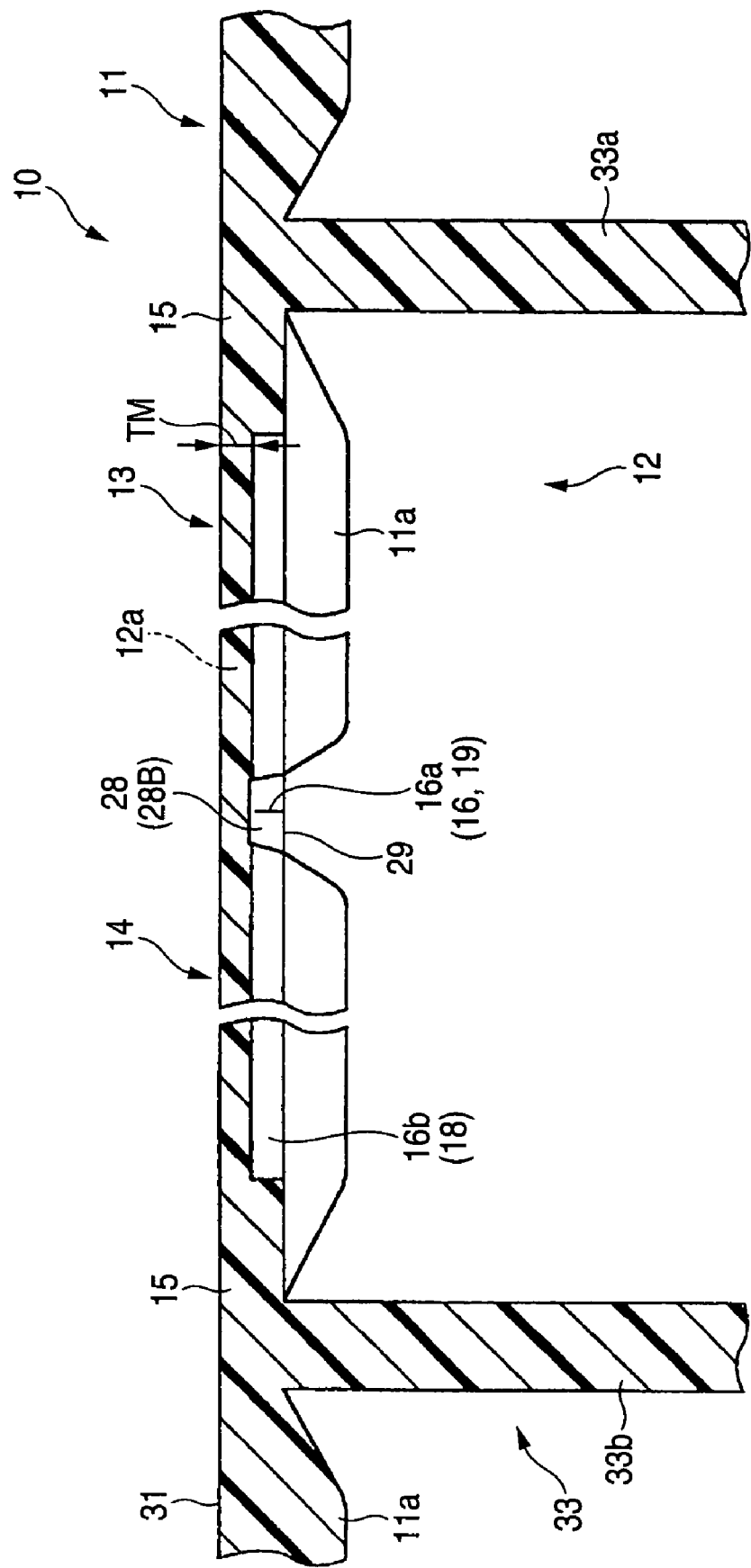
FIG. 5 is a partially omitted vertical sectional view of the airbag cover of the embodiment, which corresponds to a location taken along the line V-V in FIG. 3.
Figure 11:
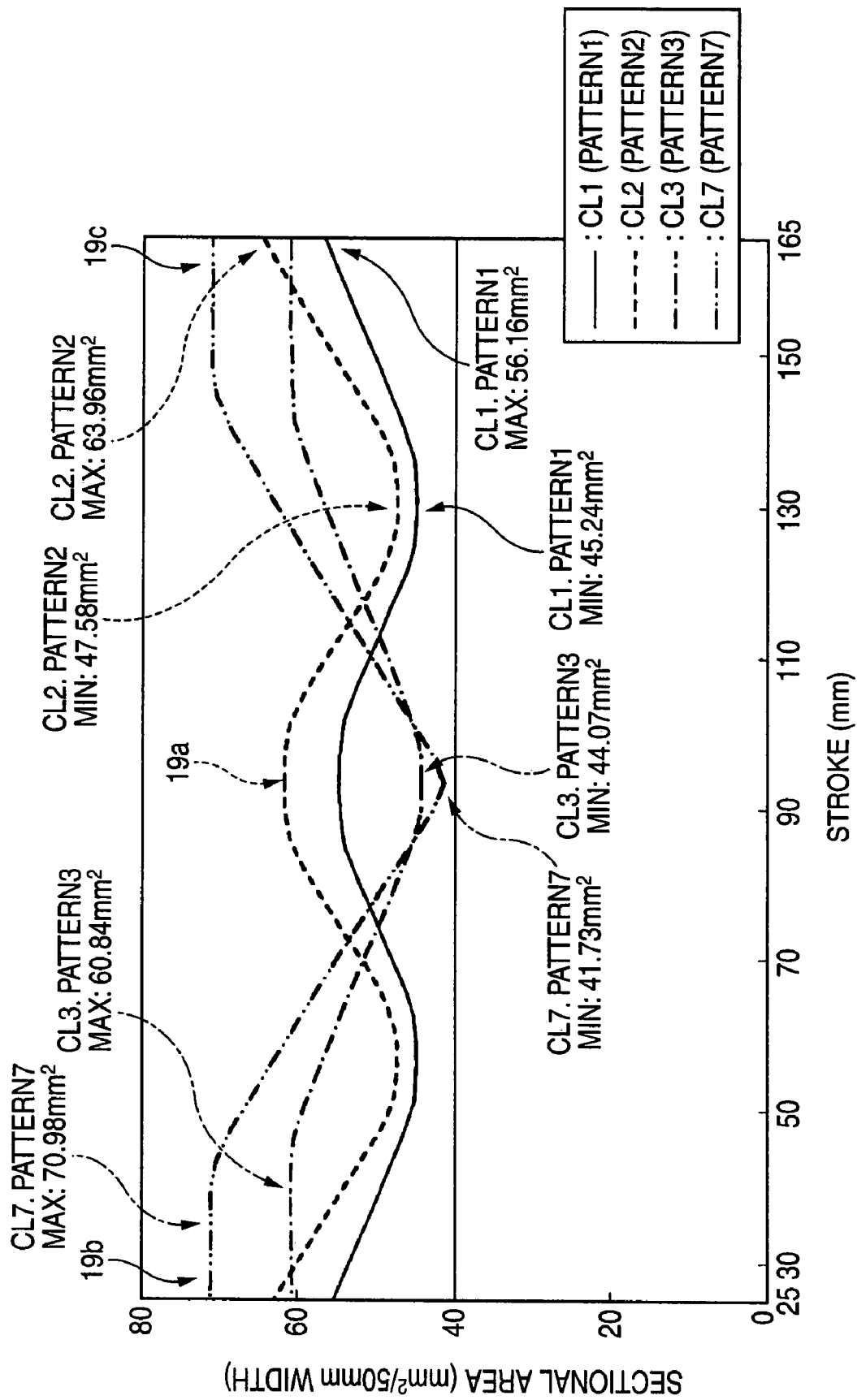
FIG. 11 is a diagram which shows sectional area change curves of the embodiment and modified examples of the embodiment.
Figure 12:
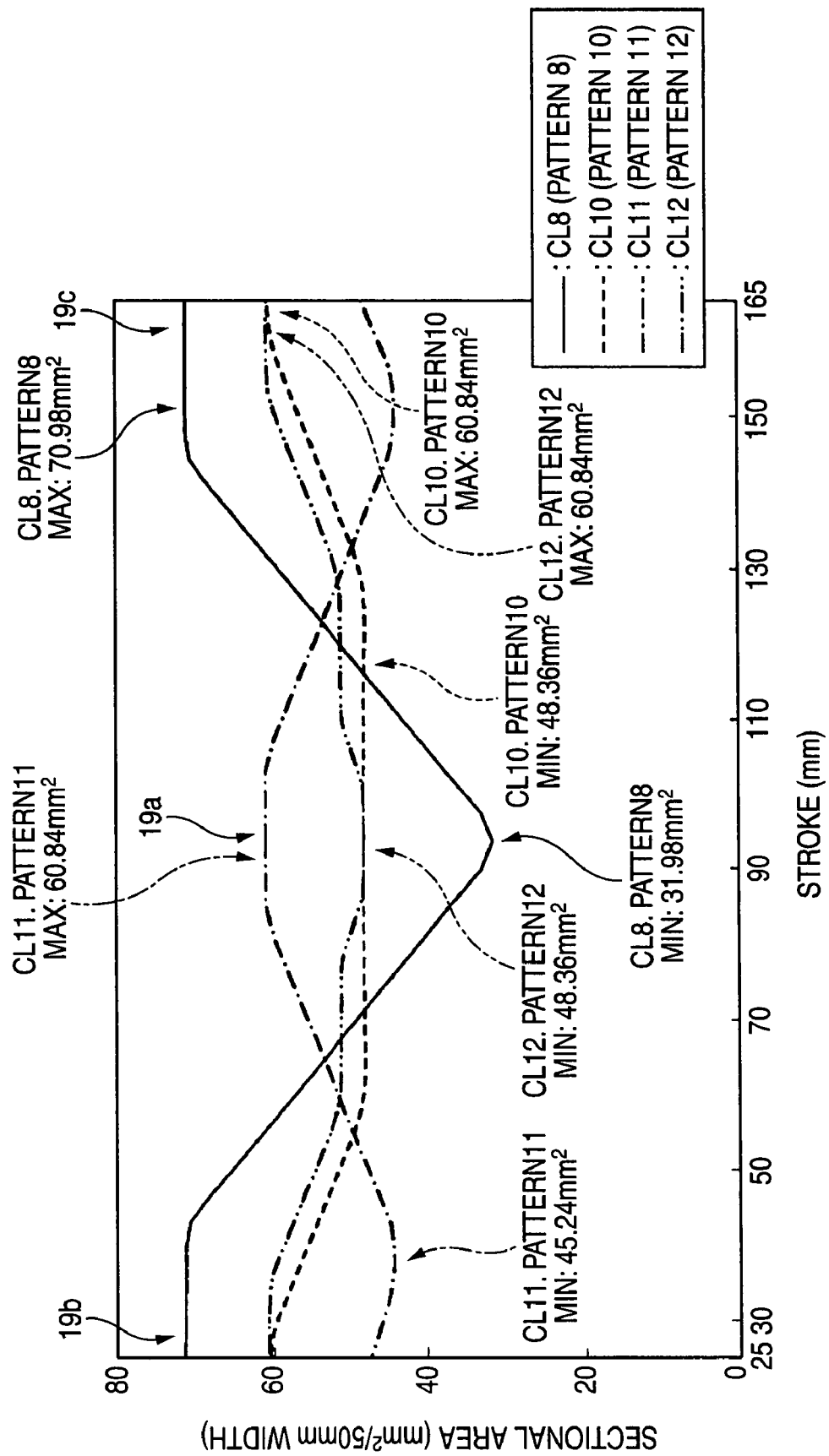
FIG. 12 is a diagram which shows sectional area change curves of other modified examples of the embodiment.
Figure 17:
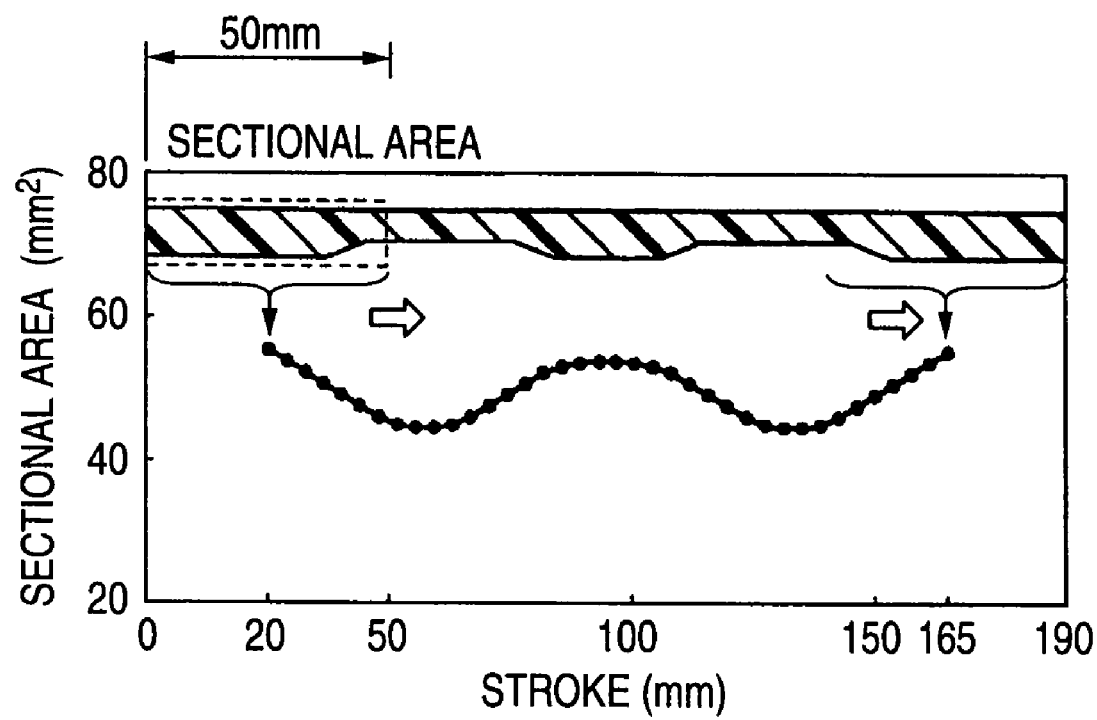
FIG. 17 is an explanatory diagram which explains a preparation method of the sectional area change curve.

As is shown in FIGS. 3 and 4, the distal edge straight section 19 which includes the recessed groove 16a formed through the cutting operation is formed by providing discontinuously thick portions 20 whose thickness TL is set to fall in the range of 1.0 to 1.6 mm and thin portions 23 whose thickness TS is set to fall in the range of 0.6 to 1.0 mm along the distal edge straight section 19 in a working area 29 whose thickness T1 is set to range in the range of 2.0 to 3.0 mm. Furthermore, in the distal edge straight section 19, as is shown in FIG. 17, in a sectional area change curve CL1 marked by plotting along the distal edge straight section 19 values of sectional areas of a segment of 50 mm along the distal edge straight section 19, the thick portions 20 and the thin portions 23 are formed so that a maximum change rate which is a rate of difference between a maximum value and a minimum value based on the maximum value [{(maximum value−minimum value)/maximum value}×100%] is made to be 15% or more without providing an area where the values of the sectional areas are reduced from a center towards both ends thereof at both ends of the sectional area change curve as a range where the values of the sectional areas are larger than the minimum value, as is shown in FIG. 11. In addition, as is shown in FIG. 17, the sectional area change curve is prepared by initiating a calculation with the center of a segment of 50 mm which is to be calculated is disposed in a position 25 mm away from an initiating point of the distal edge straight section 19 and moving the center of the segment of 50 mm to reach a position 165 mm away from the initiating point (in this point which the center of the 50 mm segment has so reached, a rear end side of the 50 mm segment has reached a terminal end of the distal edge straight section 19 whose overall length is 190 mm).

In the event of the embodiment, the thickness of the airbag cover 10 is set such that a thickness T0 at a general portion 11a of the ceiling wall portion 11 which lies at a circumferential edge portion 31 which is apart from the side wall portion 33 and in the vicinity of the centers of the lid portions 13, 14 is on the order of 4 mm, the thickness T1 of the working area 29 is 2 mm, the thickness TL of the thick portion 20 is 1.2 mm and the thickness TS of the thin portion 23 is 0.8 mm.

In addition, in the embodiment, states (tearing patterns) of the thick portion 20 and the thin portion 23 in the distal edge straight section (tearing line) 19 of the breakable portion 16 are such as to be shown under a pattern No. 1 in FIG. 7. The overall length L1 (refer to FIGS. 3, 4) in the transverse direction of the distal edge straight section 19 is made to be 190 mm as has been described before, and the thick portion 20 is disposed at a central part 19a of the distal edge straight section 19 and is made to have a length L2 of 30 mm, the thin portion 23 being made to have a length L3 of 32 mm and disposed at two locations which lie outwards of the thick portion 20. A boundary portion 26 between the thick portion 20 and the thin portion 23 is made to have a length L4 of 8 mm and is formed such that the thickness changes to moderately connect the thick portion 20 with the thin portion 23.

Because of this, a sectional area change curve of the embodiment becomes like the sectional area change curve CL1 shown in FIG. 11, in which its maximum value becomes 56.16 mm$^2$/50 mm, its minimum value becomes 45.24 mm$^2$/50 mm, and the maximum reduction rate which is a difference therebetween based on the maximum value becomes 19%. In addition, the sectional area change curve CL1 of the embodiment increases from a transverse center towards both transverse ends thereof and remains constant without decreasing towards the ends thereof.

In addition, as to thicknesses of other parts of the airbag cover 10, a thickness TM at the part where the recessed groove 16b is formed is set to range from 0.8 to 1.0 mm (1.0 mm in the embodiment). The width W1 of the recessed groove 16b is set to range from 0.3 to 1.5 mm (0.5 mm in the embodiment). Furthermore, the thickness B of the side wall portion 33 is set to range from 2 to 3 mm (2 mm in the embodiment). In addition, at parts of the ceiling wall portion 11 which lie in the vicinity of the side wall portion 33, parts which lie in the vicinity of the edge-side straight line-shaped parts 17, 18 on the lid portions 13, 14 side and parts which lie on an outer circumferential side of the side wall portion 33 and which gradually reduce their thicknesses towards the side wall portion 33 side are provided in such a manner that their thicknesses become approximate to the thickness B of the side wall portion 33 in order not to produce a shrink mark or unevenness in gloss on a front surface side of the part of the ceiling wall portion 11 where the side wall portion 33 is situated.

Figure 6A:
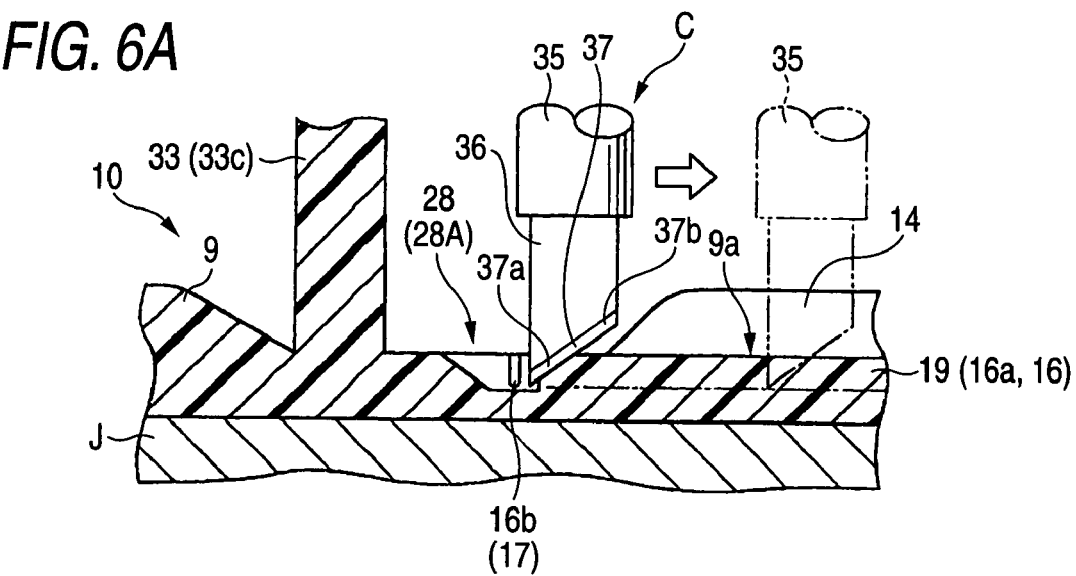
FIGS. 6A to 6C are diagrams which describe cutting operation implemented on the airbag cover of the embodiment.

To describe the manufacturing of the airbag cover 10 that is configured as has been described heretofore, firstly, a predetermined injection mold is used to mold a cover material 9 on which the recessed grooves 16b for the edge-side straight line-shaped parts 17, 18 have been formed but the recessed groove 16a has not yet been formed. Then, this cover material 9 is removed from the mold and is then disposed on a setting table J of a cutter apparatus C on which the cutter 35 is provided, as shown in FIG. 6A. Note that a suction device, not shown, is provided on the setting table J which is adapted to suck the cover material 9 securely to the setting table J side so as to prevent the deviation of the cover material 9 while the material is being work. In addition, the cutter apparatus C is made up of a holding mechanism which holds the cutter (the ultrasonic cutter) 35 in such a manner as to enable a triaxial movement in directions of X, Y and Z axes which includes a horizontal movement along the setting table J and vertical movements which intersect the setting table J at right angles and a control circuit which controls the operation of the holding mechanism, and furthermore, the cutter apparatus C includes measuring equipment having a laser displacement meter for measuring a working part.

Figure 6B:
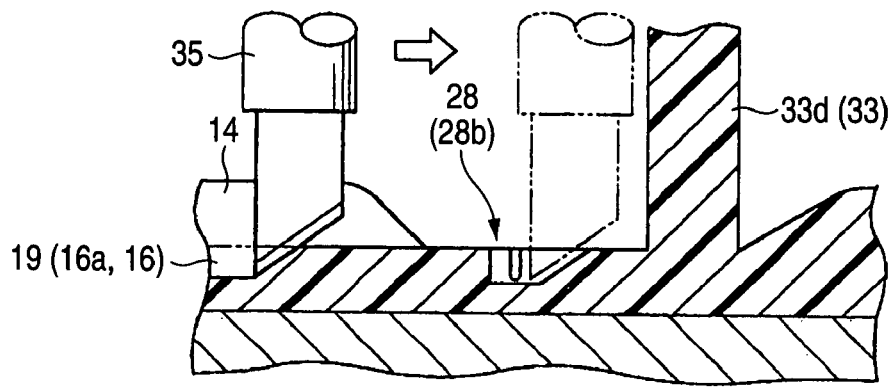
Figure 6C:
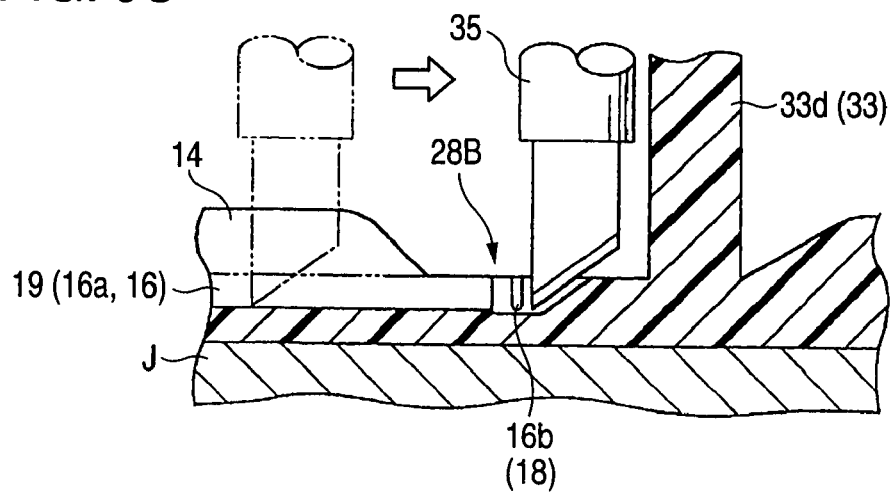

Namely, before starting the notch making operation by the cutter 35, the laser displacement meter or the like is passed over a recessed groove 16a forming part 9a (refer to FIG. 6A) on the cover material 9 set on the setting table J so as to read in advance an outer surface configuration thereof in order to verify a moving distance L0 (refer to FIG. 3) of the cutting blade 37 of the cutter 35 over which the cutting blade 37 has to be moved to make a notch for the recessed groove 16a from the position of the cutting blade accommodating portion 28 at the edge-side straight line-shaped location 17 (this is regarded as a starting end side cutting blade accommodating portion 28A) to the position of the cutting blade accommodating portion 28 at the other edge-side straight line-shaped location 18 (this is regarded as a terminating end side cutting blade accommodating portion 28B), an inserting depth of the cutting blade 37 of the cutter 35 along which the cutting blade 37 is inserted into the cutting blade accommodating portion 28A to make the notch for the recessed groove 16a, and furthermore, an inserting depth of the cutting blade 37 along which the cutting blade 37 is inserted to form the recessed groove 16a between the recessed portions 28A, 28B. Then, when performing the notch making operation, the cutter apparatus C firstly causes the cutting blade 37 of the cutter 35 to be oriented towards the distal edge straight section 19, and inserts the cutting blade 37 of the cutter 35 into the cutting blade accommodating portion 28A of the edge-side straight line-shaped part 17 which constitutes an initiating side to stop the cutting blade 37 therein. Then, as is shown in FIGS. 6A to 6C, the cutter apparatus C causes the cutting blade 37 of the cutter 35 to move towards the cutting blade accommodating portion 28B of the edge-side straight line-shaped part 18 so as to form the distal edge straight section 19.

Then, in the event that the distal edge straight section 19 which is made up of the recessed groove 16a is formed, the manufacturing of the airbag cover 10 is completed, and thereafter, the airbag cover 10 is removed from the setting table J so as to be assembled into the airbag system S for the front passenger's seat. When assembling the airbag system S for the front passenger's seat, the folded airbag 4 in which the retainer 5 has already been accommodated and the inflator 7 are accommodated and held in place within the case 8 by making use of bolts 5a and nuts 6, so as to form an airbag assembly. Then, the airbag cover 10 is placed on the airbag assembly, the locking claws 8c are locked to circumferential edges of the locking holes 33e, thereafter, the airbag assembly to which the airbag cover 10 has already been assembled is inserted into the instrument panel 2 which has been installed on the vehicle in advance from the opening 2b therein, so that the individual locking legs 31a are locked to the opening circumferential edge 2c, and the bracket 8d of the case 8 is fastened to the body 1 side. Then, a predetermined operation signal inputting lead wire which extends from an airbag operation circuit is connected to the inflator 7, whereby the airbag system S for the front passenger's seat can be installed on the vehicle.

When the airbag system S for the front passenger's seat is activated, an inflation gas from the inflator 7 flows into the airbag 4, which is then inflated, and the airbag 4 which is being inflated drastically pushes the projection opening portion 12, whereby the breakable portion 16 is broken, and the lid portions 13, 14 of the airbag cover 10 are opened forwards and rearwards, respectively, so that the airbag 4 is allowed to project largely from the projection opening 12a which is formed as a result of the lid portions 13, 14 being so opened, so as to protect the occupant seated in the front passenger seat.

In the airbag cover 10 of the embodiment, the thick portions 20 and the thin portions 23 are provided so that the maximum reduction rate which is the rate of difference between the maximum value and the minimum value in the sectional area change curve CL1 becomes 19%, which is larger than 15%. In addition, the sectional area change curve CL1 increases from the transverse center towards both the transverse ends thereof and stays constant without decreasing towards both the ends. Because of this, even at low temperatures, the breakage load can be reduced so as to allow the distal edge straight section 19 to be broken.

In addition to the thin portions 23 whose thickness is set to be 0.8 mm, the thick portions 20 whose thickness is set to be 1.2 mm so as to be thicker than the thin portions 23 are formed at three locations along the distal edge straight section 19, so as to prevent the occurrence of easy deformation when the airbag cover is pressed unnecessarily.

Consequently, with the airbag cover 10 of the embodiment, even though the airbag cover 10 is formed into the single layered airbag cover and the distal edge straight section 19 of the breakable portion 16 is formed through the cutting operation, the state can be avoided where unnecessary dents are produced when the airbag cover is pressed, and the breakage load can be reduced at low temperatures.

The measurement of a breakage load at low temperatures was carried out by removing an airbag cover from a constant temperature bath in which the airbag cover was stored at a temperature of −35° and measuring an internal pressure of an airbag when the airbag cover was broken at the time the surface temperature of the airbag cover reached −25° C. With the airbag cover 10 of the embodiment (which adopted the pattern 1 as its tearing pattern and the curve CL1 as its sectional area change curve), the internal pressure of the airbag 4 at the time the airbag cover 10 was broken was 331 kPa, which is less than 400 kPa, whereby the breakage load at low temperatures is reduced.

As is shown in FIG. 7, an airbag cover AC1 in which a distal edge straight section 19 of a constant thickness of 0.8 mm was formed integrally at the time of molding and airbag covers AC2 to AC4 in which distal edge straight sections 19 of constant thicknesses of 0.8 mm, 1.0 mm and 1.2 mm were formed by making use of the cutting operation after the airbag covers were molded were prepared as comparison examples 1, 2, 3 and 4, and internal pressures of airbags 4 when the respective airbag covers were broken were measured in the similar way to that used in measuring the internal pressure of the airbag when the airbag cover of the embodiment was broken to obtain internal pressures of 400 to 450 kPa, 296 kPa, 448 kPa and 597 kPa, respectively. Note that these airbag covers were different from each other in the thickness of the distal edge straight sections 19 only and were identical to the airbag cover 10 of the embodiment with respect to molding material and dimensions and shapes of the other parts.

With the airbag covers AC1, AC3 and AC4 of the comparison examples, the internal pressure values of the airbags when the airbag covers were broken were 400 kPa or more, and the breakage loads at low temperatures are large. In addition, with the airbag cover AC2 of the comparison examples, while the internal pressure value of the airbag at the time the airbag cover was broken was 296 kPa, which is low, the feeling of the airbag cover being depressed too easily at the time of contact is felt large, and the airbag cover AC2 is impractical. Consequently, in the event that a distal edge straight section 19 is formed with a constant thickness, since a situation is called for where the breakage load at low temperature is increased or the airbag cover is depressed unnecessarily when it is pressed, the distal edge straight section 19 formed in that way is not suitable for the airbag cover.

In addition, as the tearing pattern in which thick portions and thin portions are formed through the cutting operation, another 18 tearing patterns (pattern 2 to 19) were set, and as with the embodiment, breakage loads at low temperatures were measured as shown in FIGS. 7 to 10. Additionally, as is shown in FIGS. 11 to 16, sectional area change curves were prepared. These patterns 2 to 19 which includes the pattern representing the embodiment were different from each other in that only the number, thickness and length of thick portions 20 and thin portions 23 of distal edge straight sections 19 when they were provided discontinuously were properly changed and were the identical to the embodiment with respect to the other parts.

Among these patterns 1 to 19, with the patterns 1 to 3, 7, 8, 10 to 13, 15 and 19, internal pressure values of airbags when the airbag covers were broken are low and show values of less than 400 kPa. As is shown from sectional area change curves CL1 to 3, 7, 8, 10 to 13, 15 and 19 shown in FIGS. 11 to 13 which correspond to the patterns, respectively, and FIGS. 7 to 10, in the event that thick portions 20 and thin portions 23 are provided so that their maximum reduction rates which are differences between maximum values and minimum values based on the maximum values become 15% or more, the resulting breakage loads at low temperatures are decreased except the pattern 18. As the reason for that, it is assumed that in their distal edge straight sections 19, stress easily concentrates on an end portion 23a of a thin portion 23 which lies on a thick portion 20 side thereof and where there occurs a change in thickness, and the thick portion 20 side end portion 23a of the thick portion 23 suppresses elongation to facilitate breakage.

On the other hand, with the patterns 4 to 6, 9, 14, 16 and 17, internal pressure values of airbags when the airbag covers were broken are high and show values of more than 400 kPa. As is shown from sectional area change curves CL4 to 6, 9, 14, 16 and 17 shown in FIGS. 14, 15 which correspond to the patterns, respectively, and FIGS. 8 to 10, in the event that the maximum reduction rate is less than 15%, the difference in thickness between a thick portion 20 and a thin portion 23 throughout the segment of 50 mm becomes small. Namely, even though the difference in thickness between the thick portion 20 and the thin portion 23 becomes large locally, in this case, when a tensile force is produced in the distal edge straight section 19 by the part being pushed by the airbag which is being inflated to thereby try to break the thin portions 23, the thick portions 20 surrounding the relevant thin portions 23 can resist the tensile force so as to prevent the breakage of the thin portions 23. Because of this, with the maximum reduction rate of less than 15%, the difference in thickness between the thick portion 20 and the thin portion 23 throughout the segment of 50 mm becomes small, and it is assumed that the elongation at the thick portion 20 side end portion 23a of the thin portion 23 becomes easy to be restricted by the thick portion 20 lying therearound, whereby the breakage load at low temperatures becomes difficult to be decreased. Note that the pattern 17 is such that there occurred no breakage throughout the distal edge straight section 19.

Figure 16:
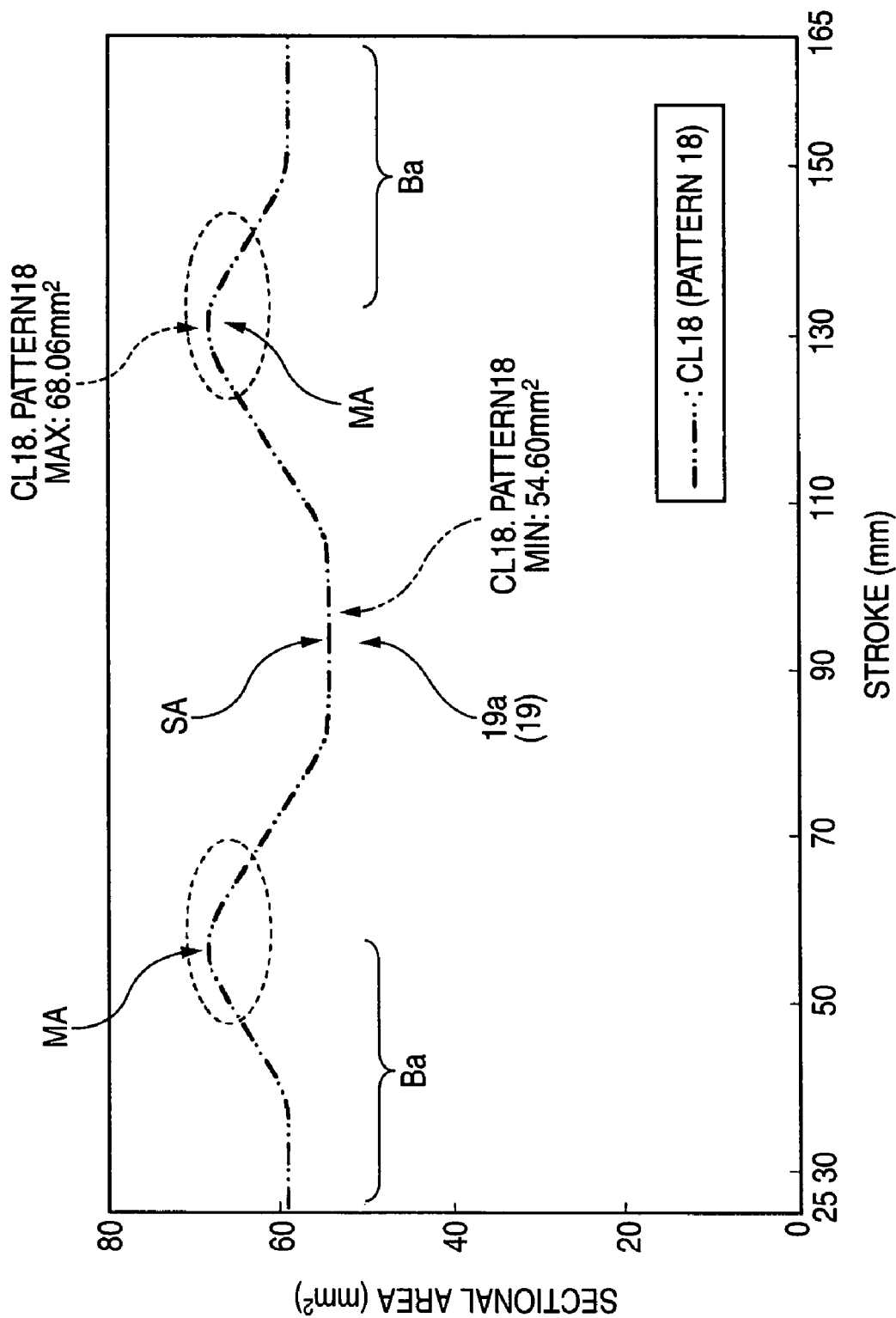
FIG. 16 is a diagram which shows a sectional area change curve of a further comparison example.

Furthermore, in the case of the pattern 18, as is shown in FIGS. 10, 16, although the maximum reduction rate becomes more than 15%, an internal pressure value of the airbag when the airbag cover was broken is high and shows a value of 549 kPa, which is larger than 400 kPa. Namely, in the sectional area change curve CL18 of this pattern 18, an area Ba where the values of the sectional areas are decreased from the center towards both ends thereof is provided at both ends of the curve as a range where the values of the sectional areas are larger than the minimum value. Namely, in the distal edge straight section 19 in which the area Ba where the values of the sectional areas are decreased from the center towards both the ends thereof is provided at both the ends of the curve although the values are not the minimum value, on the contrary, an area SA where the values of the sectional areas become minimum is disposed in the vicinity of the center which lies away from the ends of the curve, and a part MA where the value of the sectional area is increased is disposed on both sides of the area SA. In other words, this construction results in a construction where a thin portion 23 lies at a central part 19a of the distal edge straight section 19, thick portions 20 lie on both sides of the thin portion 23, and furthermore, thin portions 23, 23 lie outwards of the thick portions 20, respectively. In a construction like this, even with the maximum reduction rate becoming 15% or more, due to the difference in thickness between the thin portion 23 at the central part 19a of the distal edge straight section 19 and the thick portions 20 which lie on both the sides of the thin portion 23, when the airbag cover is pushed by the airbag which is being inflated, it is assumed that a situation is called for where an elongation is produced to some extent at all the thin portions 23 in the distal edge straight section 19 including the thin portion 23 at the central part 19a. Namely, as this occurs, the breakage load of the distal edge straight section 19 is increased as a whole, whereby the effect to reduce the breakage load is disrupted.

Figure 13:
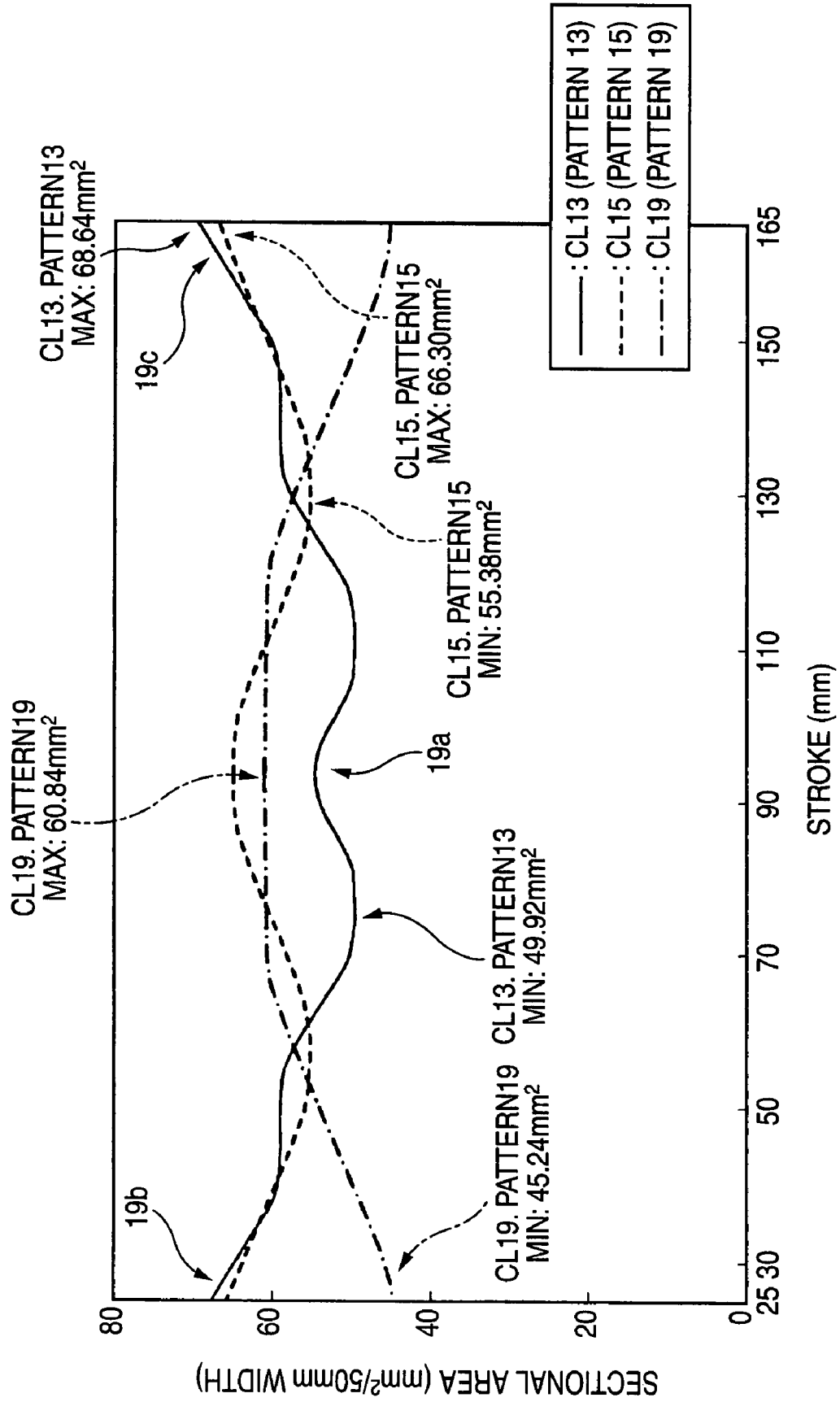
FIG. 13 is a diagram which shows sectional area change curves of another modified examples of the embodiment.
Figure 14:
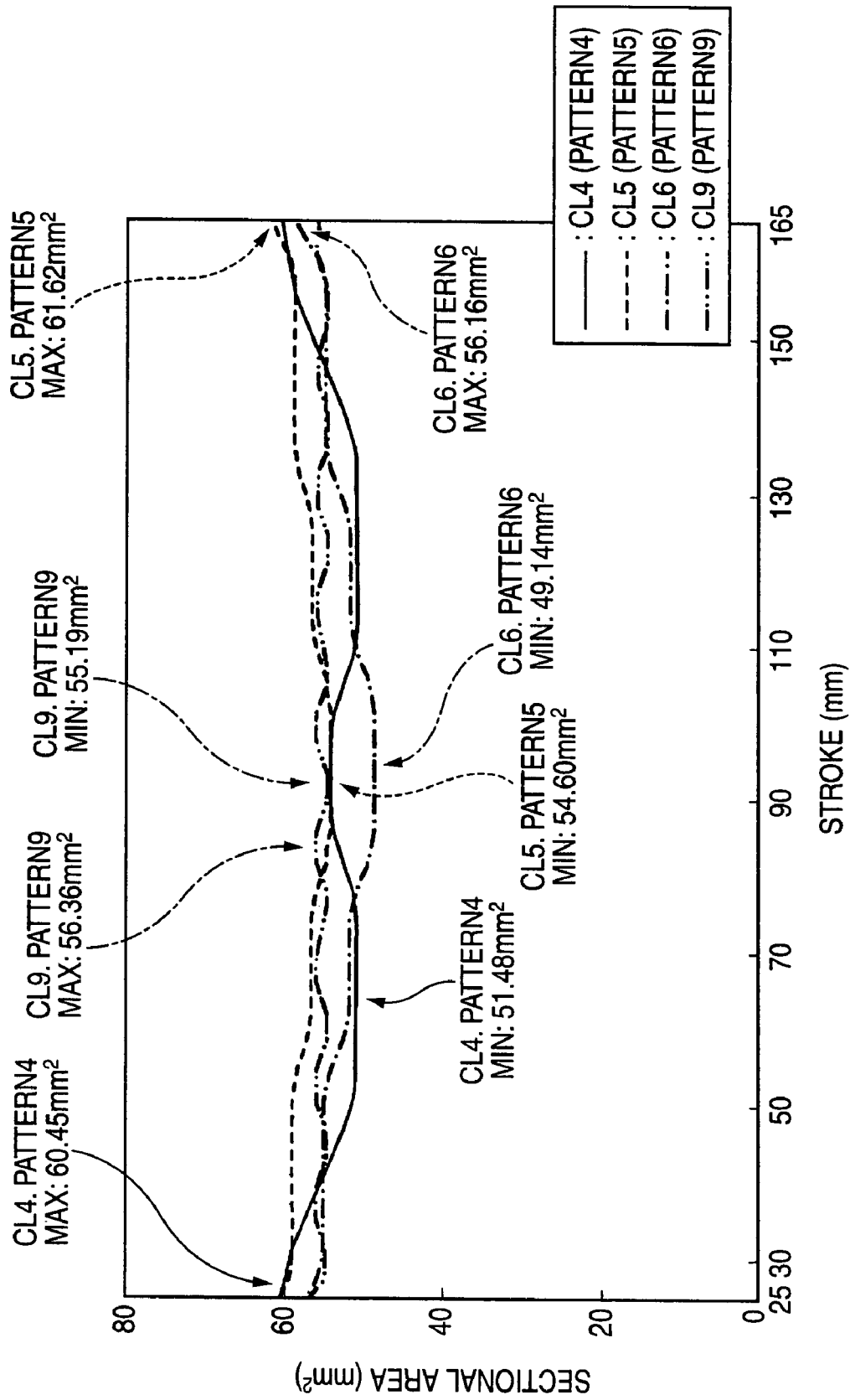
FIG. 14 is a diagram which shows sectional area change curves of comparison examples.
Figure 15:
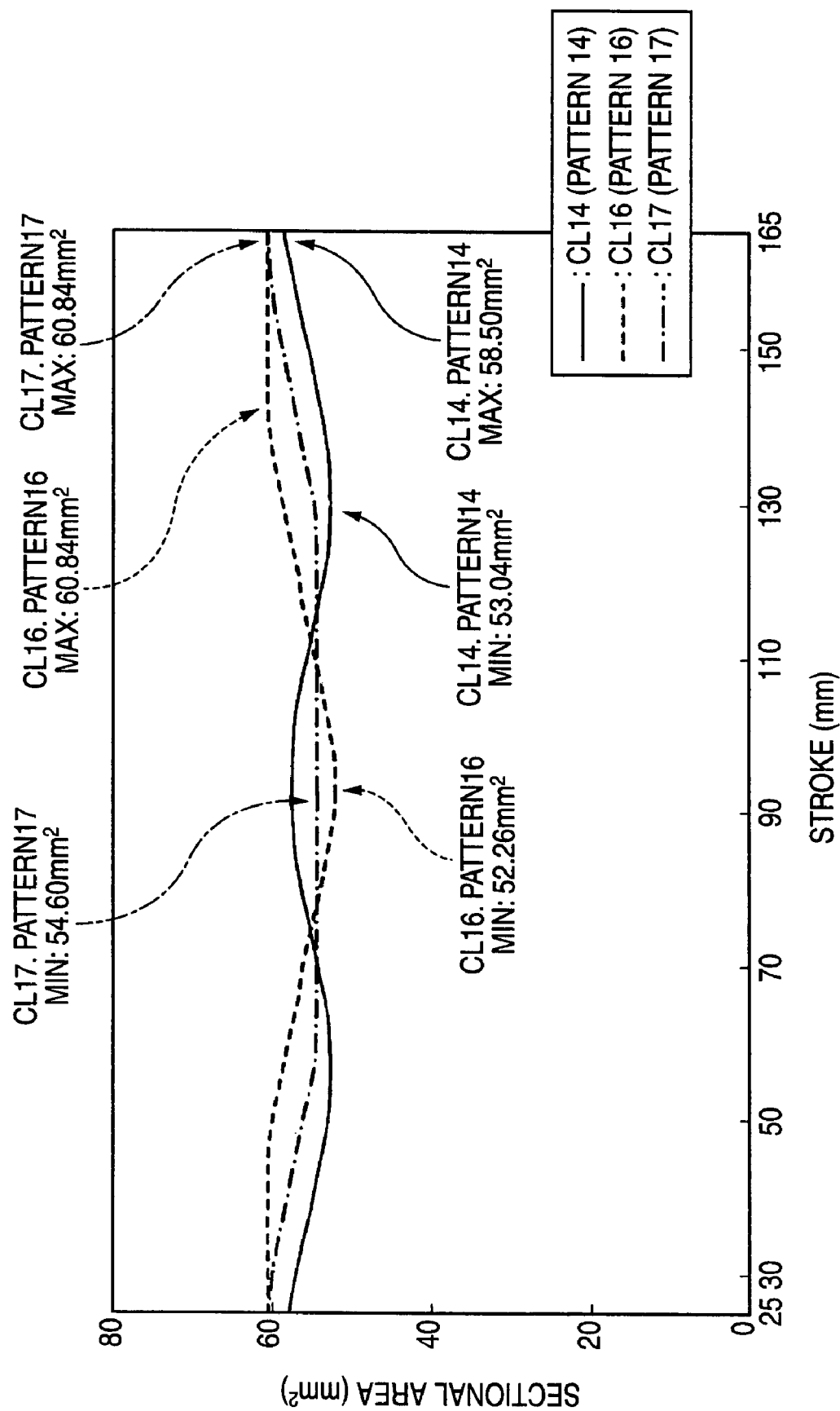
FIG. 15 is a diagram which shows sectional area change curves of other comparison examples.

Because of this, as in the pattern 13 in which thin portions 23 are provided at three locations as is shown in FIGS. 9, 13, the value of the sectional area change curve CL13 may only have to continue to increase as the curve extends away from a central part 19a towards both ends thereof without decrease. In this case, it is assumed that an elongation is difficult to be produced in thin portions 23 lying outwards of a thick portion 20, and hence, stress is caused to easily concentrate on both end portions 23a of the central thin portion 23 which lie to face the adjacent thick portions 20, respectively, whereby even at low temperatures, the breakage load can be reduced smoothly so that the distal edge straight section 19 can be broken. Alternatively, although the number of thin portions 23 provided is small, as in the sectional area change curves CL1, 2, 10 of the patterns 1, 2, 10 shown in FIGS. 7, 9, 11, 12, the value of the sectional area change curve may only have to continue to be increased as the curve extends from a central part 19a of the distal edge straight section 19 towards both ends 19b, 19b thereof without decrease to stay at a certain determined value after the increase has completed. In these cases, too, it is assumed that stress is caused to easily concentrate on both thick portion 20 side end portions 23a of thin portions 23 which lie outwards of a thick portion 20, whereby even at low temperatures, the breakage load can be decreased smoothly so that the distal edge straight section 19 can be broken.

In the patterns 1 to 3, 7, 8, 10 to 13, 15 and 19, in addition to the thin portion 23 whose thickness is set to range from 0.6 to 1.0 mm, the thick portion 20 whose thickness is set to range from 1.0 to 1.6 mm so as to become thicker than the thin portion 23 is formed in the distal edge straight section 19. Furthermore, in these patterns 1 to 3, 7, 8, 10 to 13, 15 and 19, the total sum of sectional areas becomes more than 190 mm² which is the total sum of sectional areas of the comparison example 3 in which the thickness is made to be constant at 1.0 mm throughout the distal edge straight section 19. Because of this, the occurrence of easy deformation in the airbag cover when it is pressed unnecessarily is suppressed.

Figure 18:
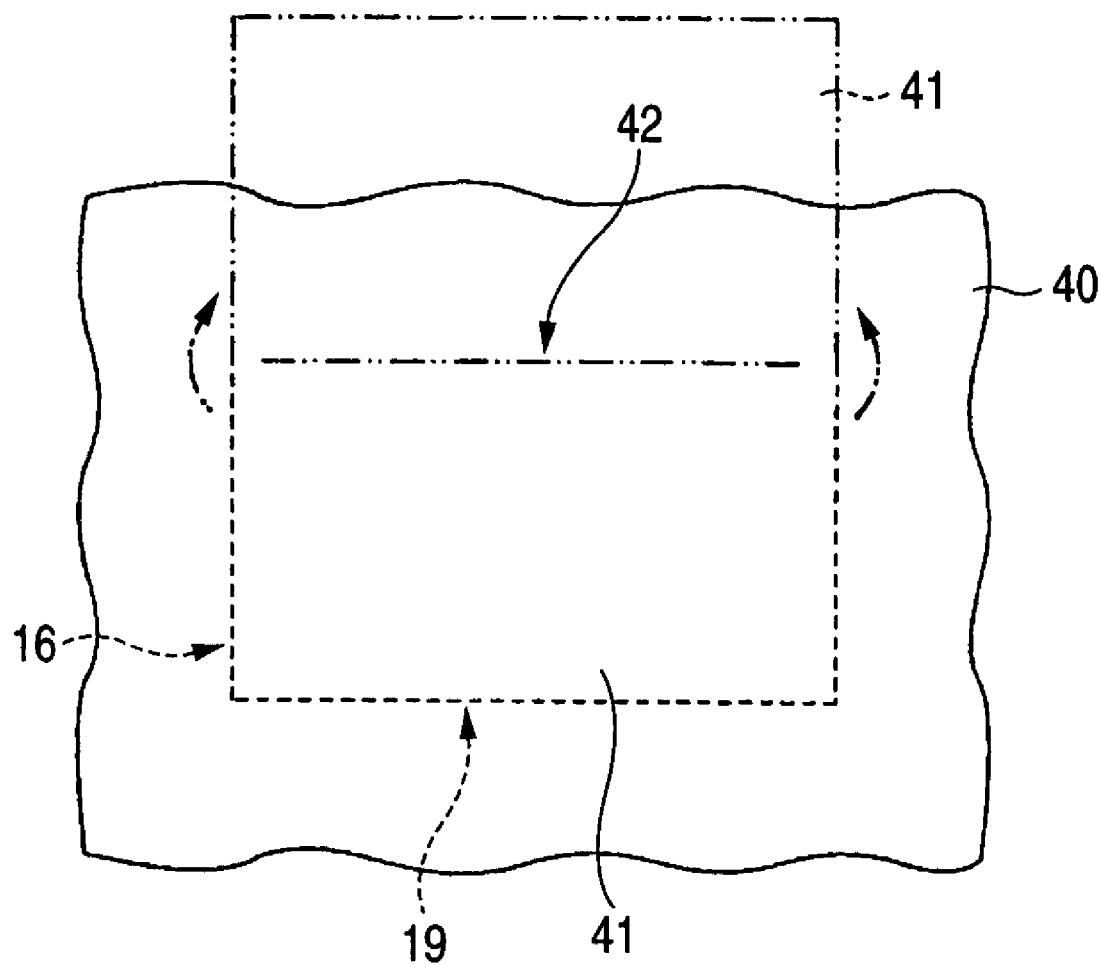
FIG. 18 is a diagram showing an airbag cover of a modified example of the embodiment.
Figure 19:
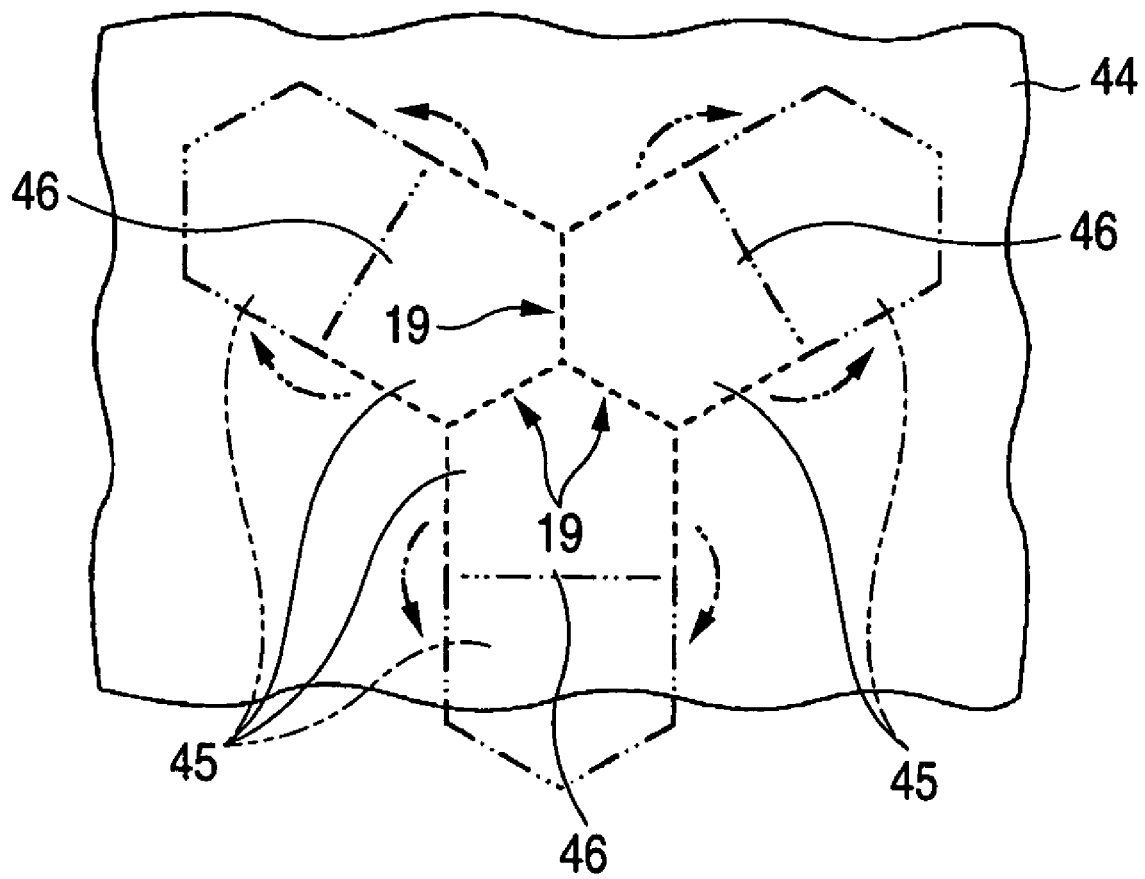
FIG. 19 is a diagram showing an airbag cover of another modified example of the embodiment.

In addition, while in the airbag cover 10 of the embodiment, the horizontal rod-like part of the H-shape of the breakable portion 16 which is formed into the H-shape so as to open the two front and rear lid portions 13, 14 is described as the distal edge straight section 19 of the breakable portion 16, the distal edge straight section 19 of the embodiment may be provided in the position of a straight line-shaped part of a breakable portion 16 of an airbag cover 40 shown in FIG. 18 or an airbag cover 44 shown in FIG. 19 which lies away from a hinge portion 42, 46 of a lid portion 41, 45 which functions as a hinge when the lid portion is opened, the breakable portion 16 being provided on the periphery of a single rectangular lid portion 42 in the airbag cover 40 shown in FIG. 18 and provided on the peripheries of three home plate-shaped (rectangular) lid portions 45 in the airbag cover 44 shown in FIG. 19.

In addition, while in the embodiment, the ultrasonic cutter is illustrated as being used as the cutting tool (the cutter 35) with the cutting blade for implementing cutting operation without producing cutting or swarf, a normal cold cutter may be used.

Furthermore, while in the embodiment, the airbag cover 10 has been described as being a separate element from the instrument panel 2 which is used in the front passenger seat airbag system S, the invention may be applied to an airbag cover which is molded integrally with the instrument panel, and furthermore, the invention may be applied to an airbag cover for an airbag system which is installed for a driver's seat or in a side of a seat.

What is claimed is:

1. An airbag cover comprising:
    a single-layered cover material formed from a synthetic resin material by molding having a lid portion which is opened to form a projection opening through which an airbag projects and a thin breakable portion defines the lid portion to be broken by a pressure of the inflating airbag, and formed,
    a part of the breakable portion which lies on a distal edge of the lid portion which lies away from a hinge portion of the lid portion when the lid portion is opened and where the breakable portion is provided being formed into a distal edge straight section which is provided in the shape of a straight line,
    the distal edge straight section being formed through cutting operation in which a working tool is moved over a rear surface of the cover material after the cover material has been molded so as to form a notch therein by a cutting blade of the working tool,
    wherein the distal edge straight section is formed by providing discontinuously a thick portion whose thickness is made to fall in the range of 1.0 to 1.6 mm and a thin portion whose thickness is made to fall in the range of 0.6 to 1.0 mm so as to be thinner than the thick portion within a working area whose thickness is set to range from 2.0 to 3.0 mm, and
    wherein, in a sectional area change curve marked by plotting distal edge section values of sectional areas taken in 50 mm segments along the distal edge straight section, the thick portion and the thin portion are formed so that a maximum change rate, which is a rate of difference between a maximum of the distal edge section values and a minimum of the distal edge section values based on the maximum, is made to be 15% or more, without providing an area where the distal edge section values of the sectional areas decrease from a center of the sectional area change curve towards both ends thereof, as a range where the distal edge section values of the sectional areas are larger than the minimum distal edge section value.

2. The airbag cover of claim 1, the synthetic resin material of the single-layered cover material being polyolefin-based thermoplastic elastomer.

3. The airbag cover of claim 1, the synthetic resin material of the single-layered cover material having an elongation under JIS-K6251 of 700% so as to fall in the range of 550 to 750%, an impact strength at −40° C. under D256 of the ASTM testing method of 90 J/m in the range of 80 to 120 J/m, and bending elastic modulus of JIS-K7203 set to 400 MPa to fall in the range of 250 to 550 MPa.

4. The airbag cover of claim 1, there being three discontinuous thick portions with a thickness in the range of 1.0 to 1.6 mm, formed at three different locations along the distal edge straight section and separated from each other by plural thin portions.

5. The airbag cover of claim 4, the three discontinuous thick portions having a thickness of 1.2 mm.

6. The airbag cover of claim 4, wherein each thick portion is formed to taper to connect with the thin portion.

* * * * *